United States Patent
Hamada et al.

[11] Patent Number: 6,028,658
[45] Date of Patent: *Feb. 22, 2000

[54] FILM VIEWER

[75] Inventors: Hisashi Hamada; Tokuji Sato, both of Asaka, Japan

[73] Assignee: Fuji Photo Film Co., Ltd., Kanagawa, Japan

[*] Notice: This patent is subject to a terminal disclaimer.

[21] Appl. No.: 09/199,453

[22] Filed: Nov. 25, 1998

Related U.S. Application Data

[63] Continuation of application No. 08/834,419, Apr. 16, 1997.

[30] Foreign Application Priority Data

Apr. 18, 1996 [JP] Japan ....................................... 8-96704
Apr. 19, 1996 [JP] Japan ....................................... 8-98495

[51] Int. Cl.⁷ .................................................. G03B 21/00
[52] U.S. Cl. .................................... 352/129; 353/DIG. 2; 396/429; 396/430
[58] Field of Search ...................... 352/129; 353/DIG. 2; 396/429, 430

[56] References Cited

U.S. PATENT DOCUMENTS

| | | |
|---|---|---|
| 3,938,885 | 2/1976 | Scholz . |
| 5,521,662 | 5/1996 | Suzuki . |
| 5,618,093 | 4/1997 | Merle et al. . |
| 5,677,759 | 10/1997 | Tanimoto et al. . |
| 5,702,169 | 12/1997 | Nishimura . |
| 5,903,337 | 5/1999 | Hamada et al. ........................ 352/129 |

*Primary Examiner*—Russell Adams
*Attorney, Agent, or Firm*—Young & Thompson

[57] ABSTRACT

A lamp house holds a light source, which is attached to a bottom plate. A film feed unit is arranged above the light source. A cartridge chamber is provided at the right of the unit body, and a film takeup chamber is formed at the left of the unit body. The takeup chamber is provided with a takeup spool. A film feed motor is built in the takeup spool, and the rotational force of the motor is transmitted to a spool driving shaft of the cartridge chamber via a driving force transmission mechanism. A film feed unit body to be incorporated into a camera is also used as a film feed unit body including the cartridge chamber, the takeup chamber and the driving force transmission mechanism. In order to observe the frame images on the film, the developed film is pulled out of a film cartridge mounted in the cartridge chamber.

17 Claims, 16 Drawing Sheets

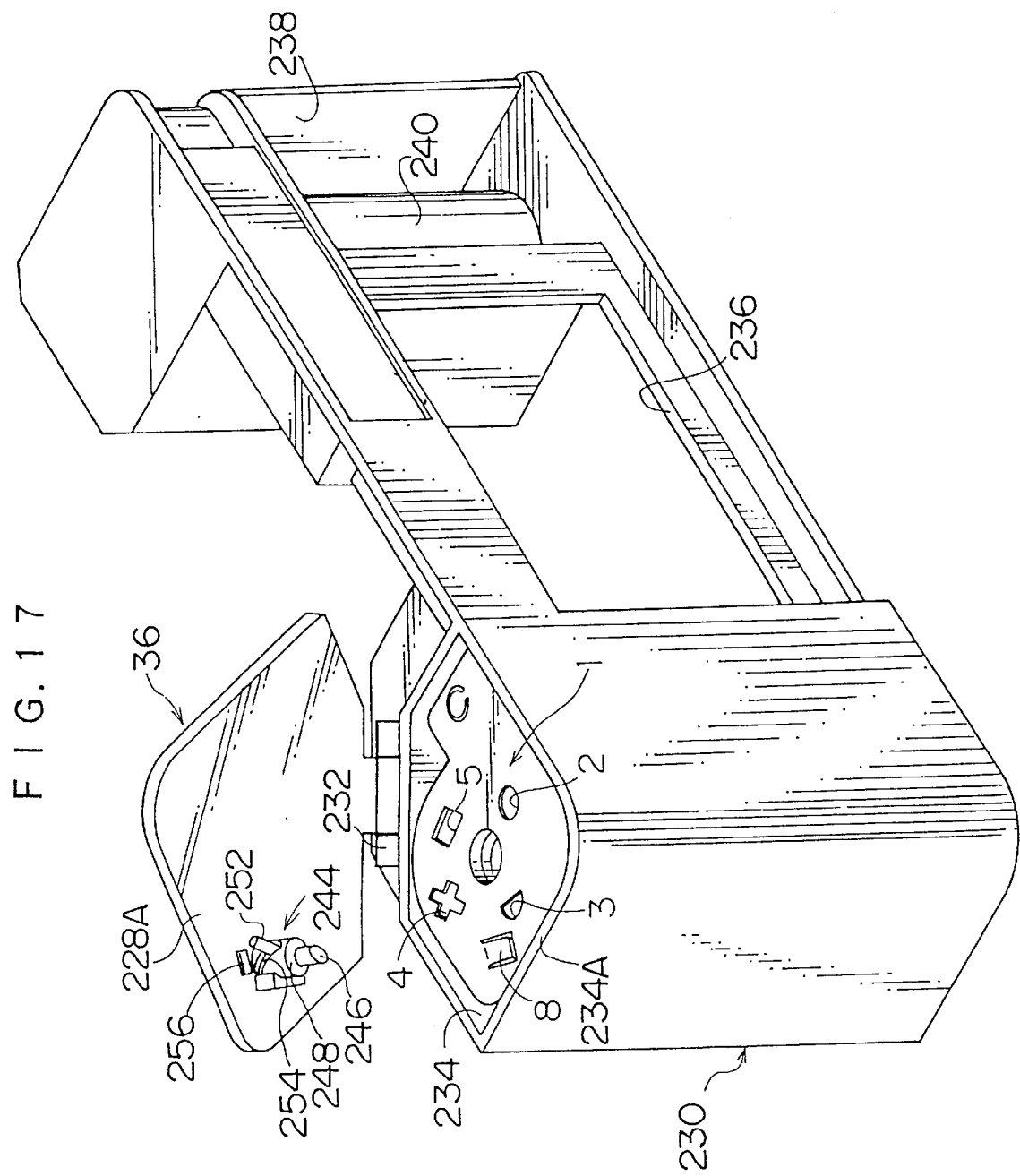

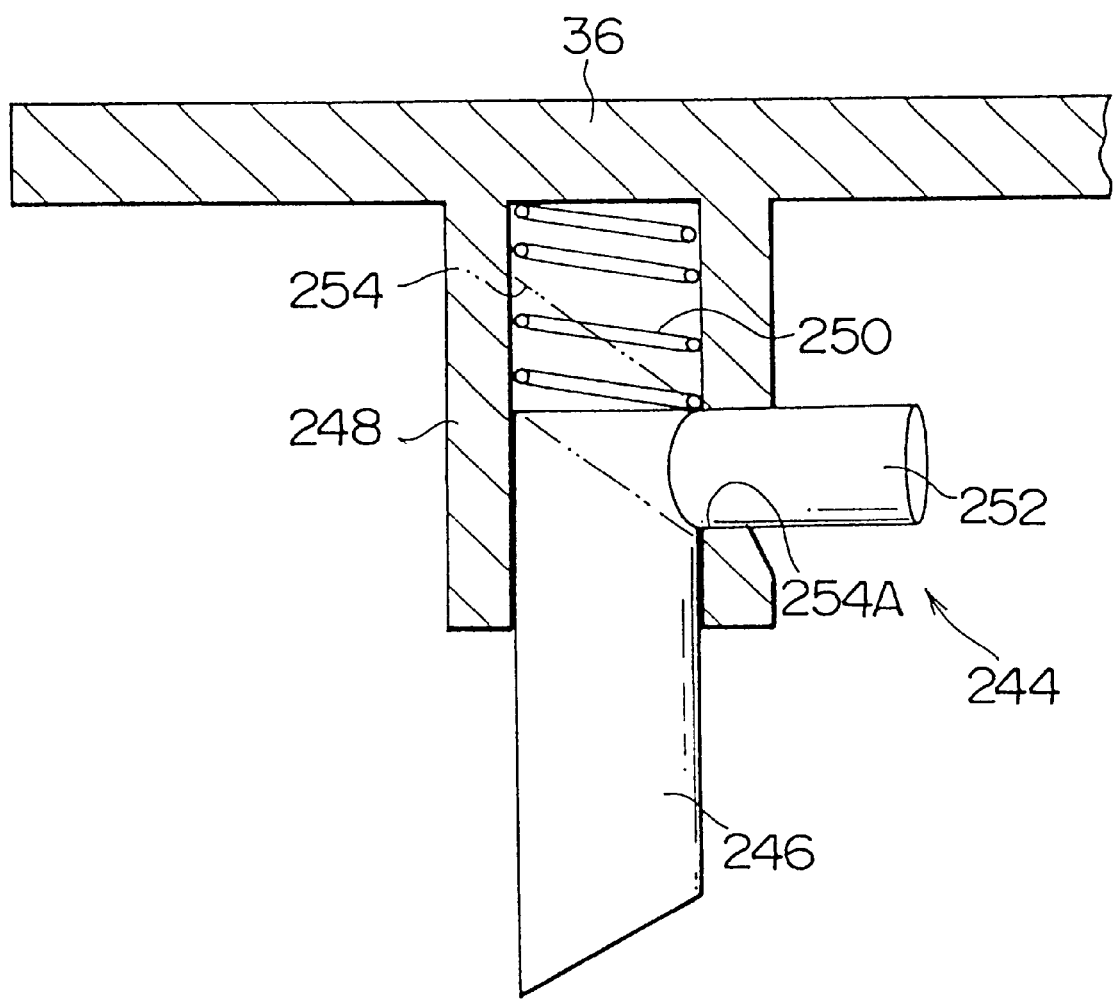
F I G. 1 8

FILM VIEWER

CROSS-REFERENCE TO RELATED APPLICATIONS

This application is a continuation of copending application Ser. No. 08/834,419, filed Apr. 16, 1997.

BACKGROUND OF THE INVENTION

1. Field of the Invention

The present invention relates to a film viewer which pulls developed film out of a film cartridge so that the film can be observed.

2. Description of the Related Art

A plastic film cartridge of an Advanced Photo System (APS) has been proposed in newspapers, etc., which contains photographic film and is smaller than a conventional film cartridge which houses 135 film.

The above-mentioned film cartridge is provided with a shutter (a light-shielding lid) which can be opened at a film pull-out opening thereof. Before and after the film is exposed, the entire film leader is wound in the cartridge, and the light-shielding lid is closed. When the user mounts the film cartridge on the camera, the light-shielding lid is opened, and the film is pulled out. The user brings the film cartridge to a processing laboratory to develop the film. After the processing, the processing laboratory returns the film in the film cartridge to the user.

A visual exposure index is provided on the film cartridge to inform the user whether the photographic film is unused, the film is being exposed, the film has been exposed, or the film has been developed. That is, as shown in FIG. 14, four marks (openings) 2 (unused), 3 (being exposed), 4 (having been exposed), and 5 (having been developed) are formed on an end face 1A of a film cartridge 1 around a spool 6, and these four marks have different shapes. A sectorial white plate 7 of which central angle is 60°–90° is provided at the inside of the marks (openings) 2–5, and it is positioned at one of the openings 2–5. The white plate 7 rotates together with the spool 6.

When the white plate 7 is positioned at the opening 2 for example, the circular opening 2 is displayed in white to indicate that the film cartridge 1 contains the unused photographic film. When the white plate 7 is positioned at the semi-circular opening 3, the opening 3 is displayed in white to indicate that the film cartridge 1 contains the film which is being exposed (the film has been partly exposed). When the white plate 7 is positioned at the cross-shaped opening 4, the film cartridge 1 contains the exposed film. When the white plate 7 is positioned at the square opening 5, the film cartridge 1 contains the developed film.

An undevelopment indicating chip 8 is provided on the end face 1A of the film cartridge 1. The chip 8 indicates that the film contained in the film cartridge 1 has not been developed, and the chip 8 is broken at the processing laboratory when the film is developed.

According to the above-described film, when the user asks for additional prints, he or she cannot observe the frame images through a negative film sheath as in the past. Thus, a film viewer in which a film is pulled out of the cartridge is required for observing the frame images.

A conventional film viewer has a disadvantage because a film feed unit consisting of a cartridge chamber for containing the film cartridge, a film feed device for feeding the film, a film takeup chamber including a takeup spool for taking up the film fed from the cartridge, or the like must be designed and manufactured individually for every model of the viewer. Thus, it was difficult to provide a general-purpose film viewer at a lower price.

Since the film viewer is used for observing the images on the developed film, the developed film is used in the film viewer. When a film cartridge containing the undeveloped film is mounted on the film viewer, however, the film must be prevented from being pulled out.

In the case of a high-quality film viewer provided with an on-board microcomputer, etc., after the cartridge is mounted, an encoder provided on the other end 1B of the cartridge 1 is read. If the encoder indicates that the film contained in the cartridge 1 is undeveloped, an alarm, etc. can inform the user that the film cartridge containing the undeveloped film has been mounted.

In order to provide a general-purpose film viewer at a lower price, the use of the expensive parts such as the microcomputer should be avoided.

SUMMARY OF THE INVENTION

The present invention has been developed under the above-described circumstances, and has its object the provision of a film viewer which uses parts in common with an ordinary camera so that the designing and manufacturing costs can be lowered, and which enables confirmation of whether the film has already been developed or not with the simple structure.

To achieve the above-mentioned object, the film viewer of the present invention comprises: a cartridge chamber for housing a film cartridge containing photographic film which has a plurality of photographing frames and is wound around a spool; a film takeup chamber provided with a takeup spool for taking up the photographic film pulled out of the film cartridge mounted in the cartridge chamber; a film passage having an aperture between the cartridge chamber and said film takeup chamber, the aperture specifying a visual field, the film passage keeping flat the photographic film pulled out of the film cartridge; a film feed mechanism engaged with the spool of the film cartridge mounted in the cartridge chamber, the film feed mechanism winding up the photographic film from the film cartridge into the film takeup chamber or rewinding the photographic film taken up by the takeup spool of the film takeup chamber onto the spool of the film cartridge; a viewer window through which frame images on developed film pulled out of the film cartridge is observed; and in the film viewer, a film feed unit including the cartridge chamber, the film takeup chamber and the film feed mechanism is also used as a film feed unit incorporated into a camera using the film cartridge.

According to the present invention, the film feed unit to be incorporated into the camera is also used as the film feed unit of the film viewer, so that the designing and manufacturing costs of the film viewer can be lowered and the film viewer can be low-priced.

According to the present invention, the visual field through the viewer window is set to be more than 1 frame and less than 2 frames, and thereby a part of the images in frames before and after the captured frame is also captured. Thus, the user can confirm the images in the frames before and after the captured image onto the viewer window.

According to the present invention, since the film viewer window is inclined to the user's side, he or she can easily observe the film. Moreover, the film feed button, the film rewind button and the cartridge pickup confirmation lamp are provided side by side on the table at the front of the film viewer, so that the user can easily operate the buttons while observing the film through the viewer window. Furthermore, the cartridge chamber for housing the film cartridge is formed at the back of the film viewer, and the film cartridge is inserted diagonally from above. Thus, the user can easily insert the film cartridge.

According to the present invention, the film, viewer is provided with the indication means which indicates that the means provided on the film cartridge for indicating how far the film has been used indicates that the film contained in the film cartridge has already been developed. When the film cartridge is picked up, the user rotates the spool of the film cartridge and makes the indication means of the film viewer indicate that the means of the film cartridge indicates that the film has been developed. Thus, the film cartridge can be picked up while its means for indicating how far the film has been used indicates that the film contained in the film cartridge has already been developed.

To achieve the above-mentioned object, the film viewer of the present invention comprises: a cartridge chamber for housing a film cartridge containing photographic film which has a plurality of photographing frames and is wound around a spool; a film takeup chamber provided with a takeup spool for taking up the photographic film pulled out of the film cartridge mounted in the cartridge chamber; a film passage having an aperture between the cartridge chamber and the film takeup chamber, the aperture specifying a visual field, the film passage keeping flat the photographic film pulled out of the film cartridge; a film feed mechanism engaged with the spool of the film cartridge mounted in the cartridge chamber, the film feed mechanism winding up the photographic film from the film cartridge into the film takeup chamber or rewinding the photographic film taken up by the takeup spool of the film takeup chamber around the spool of the film cartridge; a viewer window through which a frame image on developed film pulled out of the film cartridge is observed; and a cartridge chamber lid for closing the cartridge chamber, the cartridge chamber lid being provided with a detection mechanism for detecting an undevelopment indicating chip of the film cartridge, the detection mechanism prohibiting the cartridge chamber lid from being completely closed when the film cartridge with unbroken undevelopment indicating chip is housed in the cartridge chamber, the detection mechanism allowing the cartridge chamber lid to be completely closed when the film cartridge with broken undevelopment indicating chip is housed in the cartridge chamber.

According to the present invention, since the undevelopment indicating chip is not broken in the film cartridge containing the undeveloped film, the cartridge chamber lid is provided with the detection mechanism which prohibits the cartridge chamber lid from being completely closed when the unbroken undevelopment indicating chip is detected. Thereby, the present invention enables the user to confirm that the film cartridge contains the undeveloped film, because the cartridge chamber lid does not close. For this reason, the simple structure can prevent the undeveloped film from being pulled out by mistake.

According to the above-mentioned detection mechanism, when the film cartridge with the unbroken undevelopment indicating chip is mounted in the cartridge chamber, the detecting member is abutted against the undevelopment indicating chip of the film cartridge as the cartridge chamber lid is closed. As the cartridge chamber lid is further closed, the detecting member is pushed by the undevelopment indicating chip to start retracting. Then, the stopper member advances in connection with the detecting member to a position which prohibits the cartridge chamber lid from being completely closed, and the cartridge chamber lid does not close. On the other hand, when the film cartridge containing the developed film is mounted in the cartridge chamber, the undevelopment indicating chip is broken, and the detection mechanism does not function. The cartridge chamber lid can be completely closed in this case.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 17 is a perspective view of a film feed unit of the film viewer;

FIG. 18 is a sectional view of a detection mechanism provided at a rear cover;

DETAILED DESCRIPTION OF THE PREFERRED EMBODIMENTS

Figure 1:
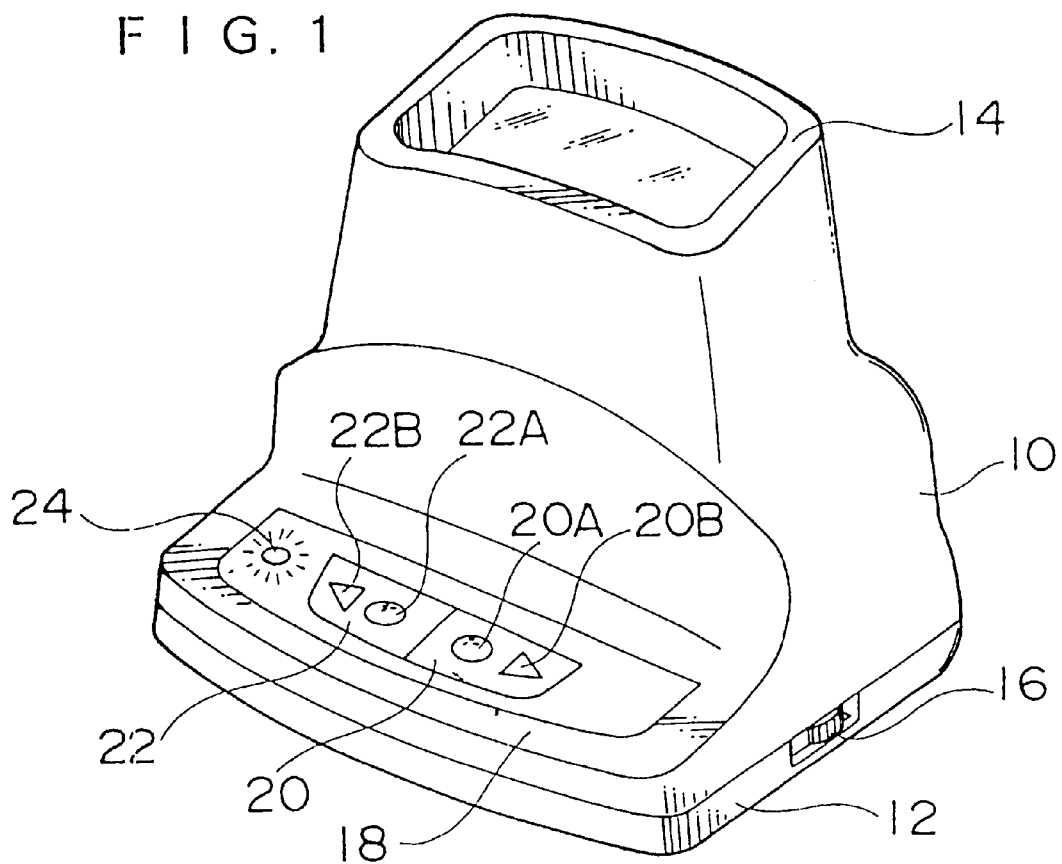
FIG. 1 is a perspective view, taken from the front, of the film viewer according to the first embodiment of the present invention.

FIG. 1 is a perspective view of a film viewer according to the first embodiment of the present invention. A bottom plate 12 is removably attached to the bottom of a film viewer body 10, and a square film viewer barrel (a viewer window) 14 is provided at the top of the film viewer body 10. A main switch 16 is provided at the side of the bottom plate 12, and the main switch 16 is slid back and forth to turn on and off the film viewer. The bottom plate 12 is provided with a power source and a light source (see FIG. 7).

A flat table 18, which projects forward, is formed at the front of the body 10, and the table 18 is provided with a film feed button 20 and a film rewind button 22. The film feed button 20 is provided with a small convex part 20A for facilitating the pressing operation thereof, and an arrow 20B indicating the running direction of the film. On the other hand, the film rewind button 22 is also provided with a convex part 22A and an arrow 22B indicating the running direction of the film.

When the film feed button 20 is pressed, the film is fed to the right in FIG. 1. On the other hand, when the film rewind button 22 is pressed, the film is rewound to the left in FIG. 1. Thus, the film feed button 20 and the film rewind button 22 are provided on the table 18 of the body 10, and thereby the buttons can be easily manipulated while the viewer barrel 14 is looked through.

The table 18 of the body 10 is provided with a cartridge pickup confirmation lamp 24 for indicating that the film cartridge 1 is allowed to be picked up from the body 10. The lamp 24 is lighted when the white plate 7 of the cartridge 1 is positioned at the opening 5, that is, a position indicating that the film cartridge 1 contains the developed film. Thus, when the spool 6 of the cartridge 1 is rotated once, the lamp 24 is lighted once.

Figure 15:
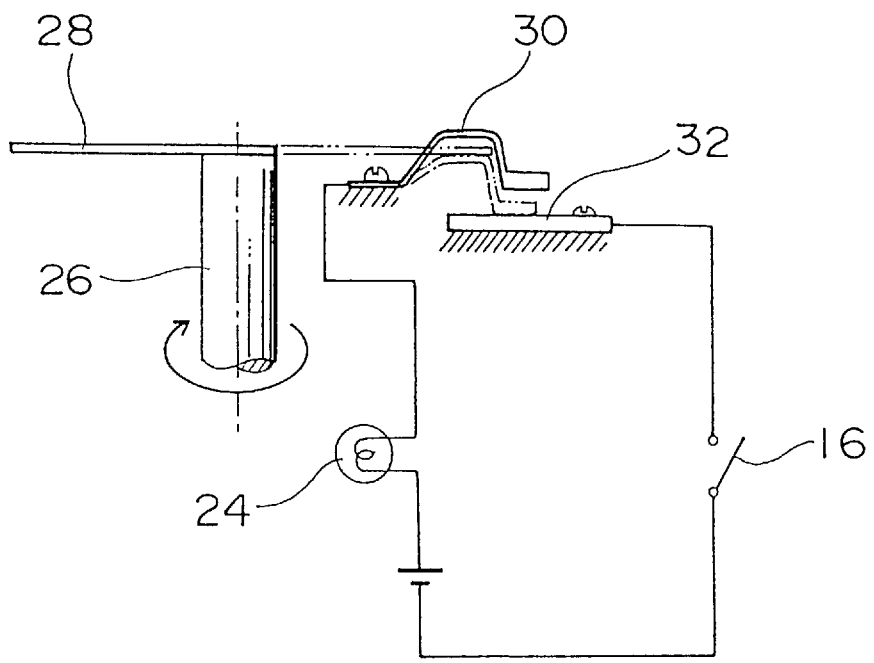
FIG. 15 is a diagram of a circuit for lighting a lamp 24 of the film viewer.

As shown in FIG. 15, a rotary lever 28 is provided at the top of a shaft 26 engaged with the spool 6 of the cartridge 1 and a movable contact 30 is provided in the rotation area of the rotary lever 28. The movable contact 30 is bent to be U-shaped, and a fixed contact 32 is provided close to the movable contact 30. When the shaft 26 engaged with the spool 6 rotates in connection with the spool 6, the rotary lever 28 integrated with the shaft 26 rotates to abut on a projecting part of the movable contact 30 to press it as shown by alternate long and two short dashes lines in FIG. 15. Then the movable contact 30 contacts the fixed contact 32, and the lamp 24 in FIGS. 1 and 15 is lighted. The position that the rotating lever 28 presses the movable contact 30 corresponds to the position that the white plate 7 of the cartridge 1 is positioned at the opening 5, that is, such a position that the visual exposure index indicates that the cartridge 1 contains the developed film.

According to the above-described structure, when the lamp 24 is lighted, the white plate 7 of the cartridge 1 is always located at the position for indicating that the cartridge 1 contains the developed film. For this reason, if the rotation of the spool 6 of the cartridge 1 is stopped and the film cartridge 1 is taken out when the lamp 24 is lighted, the visual exposure index of the film cartridge 1 indicates that the film has already been developed.

Figure 2:
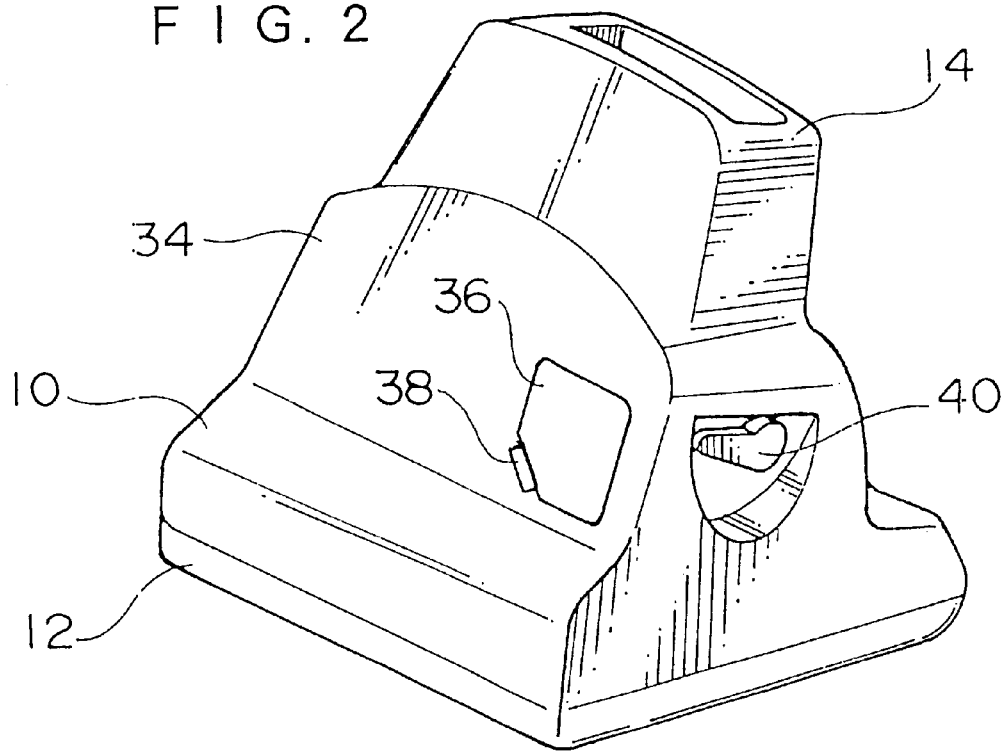
FIG. 2 is a perspective view, taken from the back, of the film viewer in FIG. 1.
Figure 3:
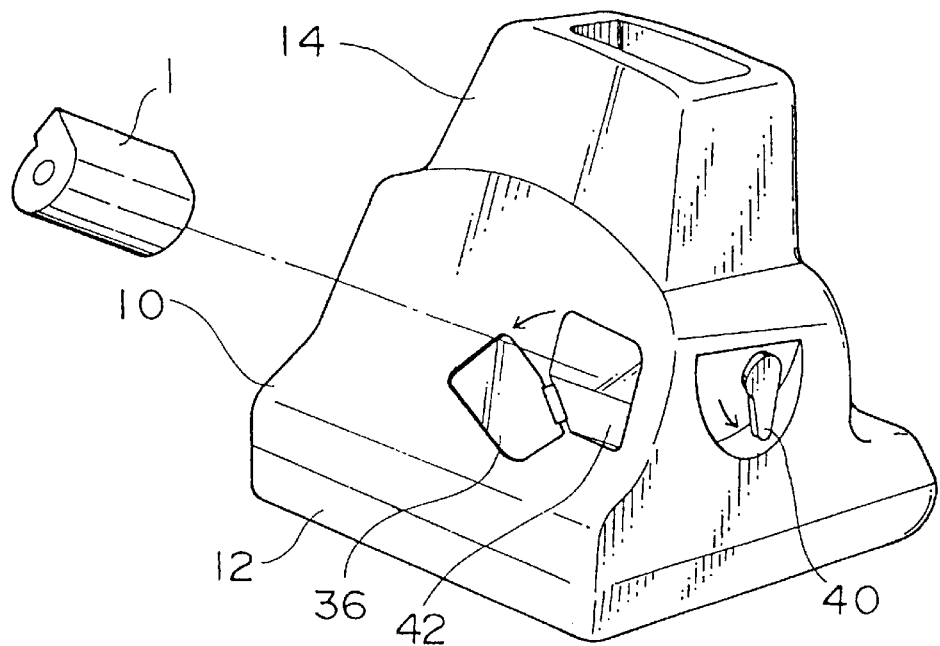
FIG. 3 is a perspective view, taken from the back, of the film viewer in FIG. 1.

FIGS. 2 and 3 illustrate the back of the film viewer according to the first embodiment of the present invention. A cartridge chamber lid 36 is provided on a flat portion 34 at the back of the body 10 of the film viewer. The lid 36 is substantially trapezoid so as to correspond to the external shape of the cartridge 1, and the lid 36 is swingable on a hinge 38. A cartridge chamber lid opening knob 40 is provided at the side of the body 10 of the film viewer. When the knob 40 is pushed down to rotate from a horizontal position in FIG. 2 to a vertical position in FIG. 3, a lock mechanism of the lid 36 is released so that the lid 36 can be opened as shown in FIG. 3. The lock mechanism of the lid 36 will be described later (see FIG. 9).

As depicted in FIG. 3, a cartridge chamber 42 for housing the cartridge 1 is formed inside the cartridge chamber lid 36, and the cartridge chamber 42 is formed along the sectional shape of the cartridge 1 so as to contain the cartridge 1. A drive shaft (not shown) for opening and closing the light-shielding lid provided at the film pull-out opening of the cartridge 1, and a drive shaft (not shown) for driving the spool 6 of the cartridge 1 are provided in such a manner as to project at the bottom of the cartridge chamber 42. When the cartridge chamber lid 36 is opened and the film cartridge 1 is loaded, the above-mentioned, drive shafts are engaged with key grooves formed on the end face of the cartridge 1.

Figure 4:
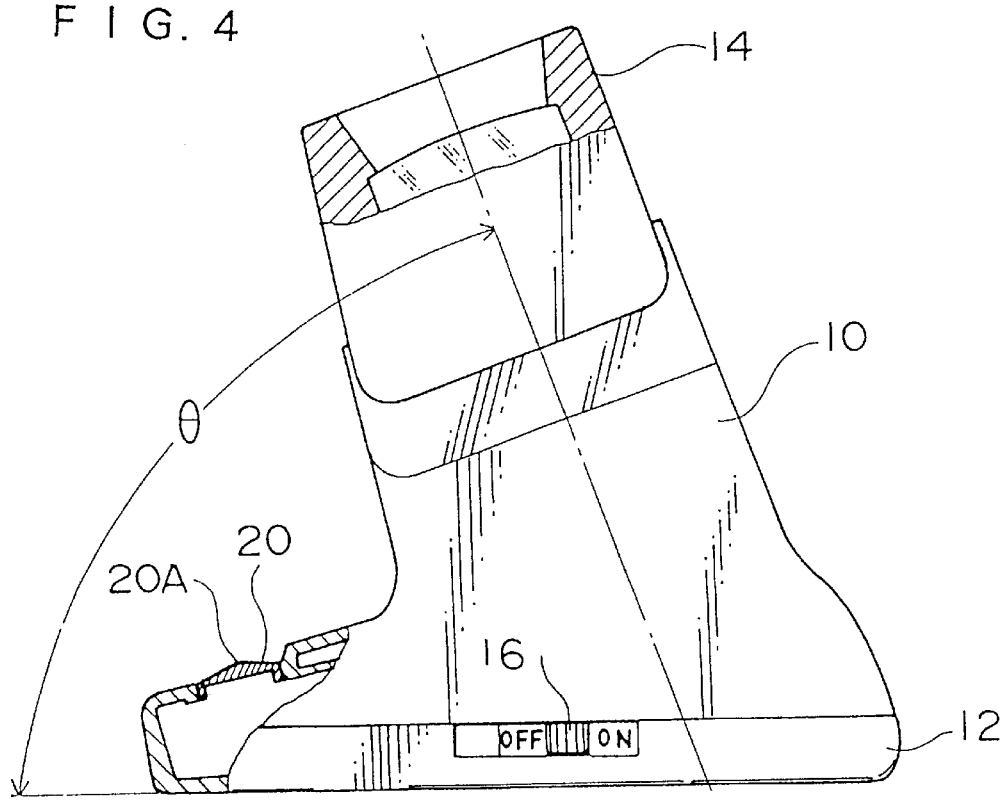
FIG. 4 is a side view of the film viewer in FIG. 1.

FIG. 4 is a side view of the film viewer according to the first embodiment of the present invention. As shown in FIG. 4, the viewer barrel 14 provided at the top of the film viewer body 10 is inclined at an angle $\theta$ (with respect to a horizontal plane) toward the user. The angle $\theta$ may be set within 90°. Because the viewer barrel 14 is inclined toward the user, the user can sit on a chair and observe the film through the viewer barrel 14 without standing even when the film viewer of the present invention is used on a desk, etc.

Figure 5:
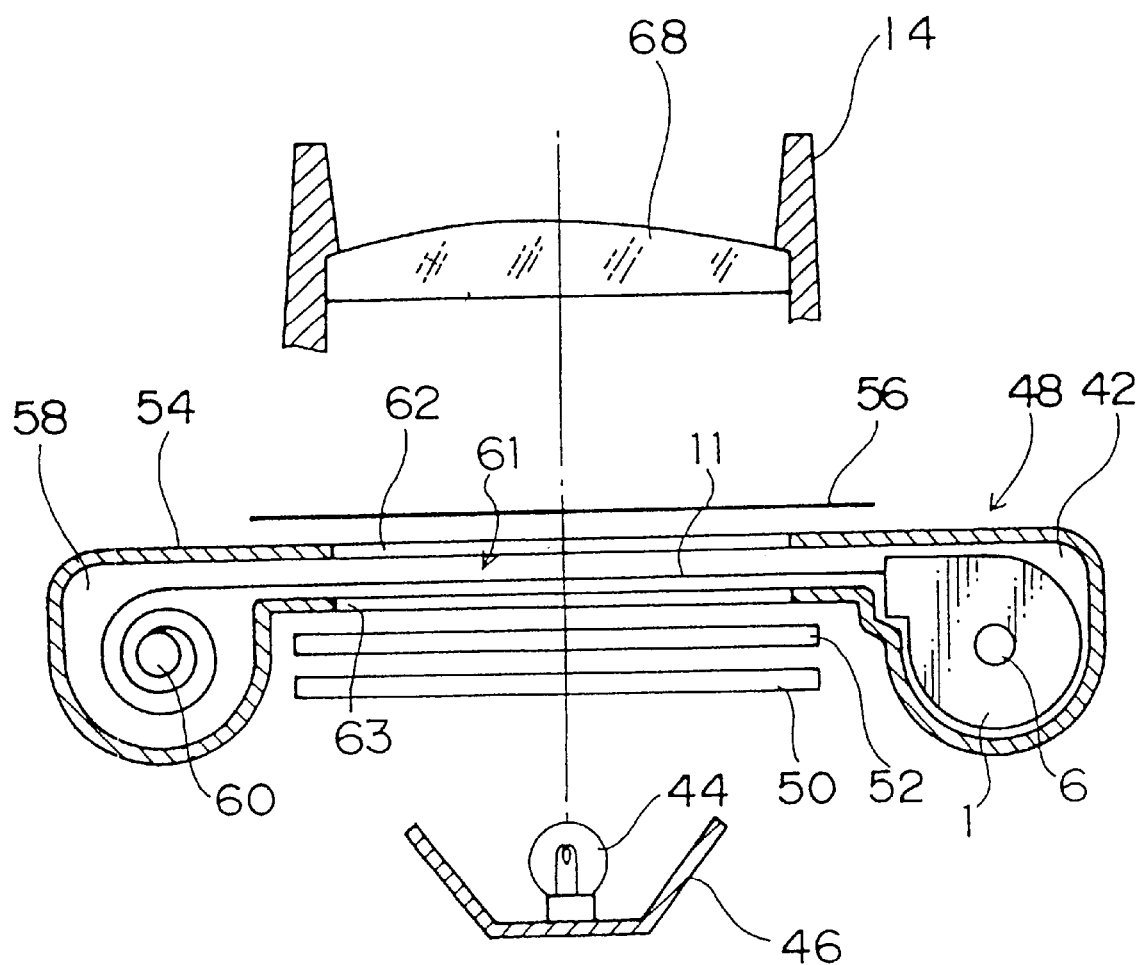
FIG. 5 is a view explaining the inner structure of the film viewer in FIG. 1.

FIG. 5 illustrates the inner structure of the film viewer according to the first embodiment of the present invention. A light source 44 is held by a lamp house 46, and the light source 44 and the lamp house 46 are attached to the bottom plate 12 as stated previously (see FIG. 7). A film feed unit 48 is arranged above the light source 44, and the film feed unit 48 consists of a blue filter 50, a milk-white diffusion plate 52, a film feed unit body 54, and a mask 56. The blue filter 50 eliminates the tinge of red from light of the light source 44, and the milk-white diffusion plate 52 equalizes the quantity of the light from the light source 44. The unit body 54 has the cartridge chamber 42 and a film takeup chamber 58 arranged at the left thereof.

The film takeup chamber 58 is provided with a takeup spool 60. A film feed motor (not shown) is incorporated in the takeup spool 60. The rotational force of the film feed motor is transmitted to the spool 6 of the cartridge 1 via a driving force transmission mechanism such as gears 81a, 81b . . . (see FIG. 8). The film feed motor rotates the drive shaft of the cartridge chamber 42 and the takeup spool 60 of the film takeup chamber 58. The film 11 pulled out of the cartridge 1 is fed to the film takeup chamber 58, and it is taken up by the takeup spool 60. During the feeding, the film 11 is kept flat on a film passage 61.

A film exposure opening 62 and a light transmission opening 63 are formed on the film passage 61 of the film feed unit body 54. The image light of the film 11 illuminated by the light source 44 can be transmitted through the film exposure opening 62. The blue filter 50, the milk-white diffusion plate 52 and the mask 56 are attached to the film feed unit body 54, and they are supported by the film viewer body 10. A film feed unit to be incorporated into the camera is used as the film feed unit 48, which includes the cartridge chamber 42, the film takeup chamber 58 and the driving force transmission mechanism. This will be explained in detail later.

A condenser lens 68 is arranged above the film feed unit 48 and is attached to the viewer barrel 14. The section of the viewer barrel 14 is rectangular which corresponds to the shape of the opening in the mask 56.

Figure 6:
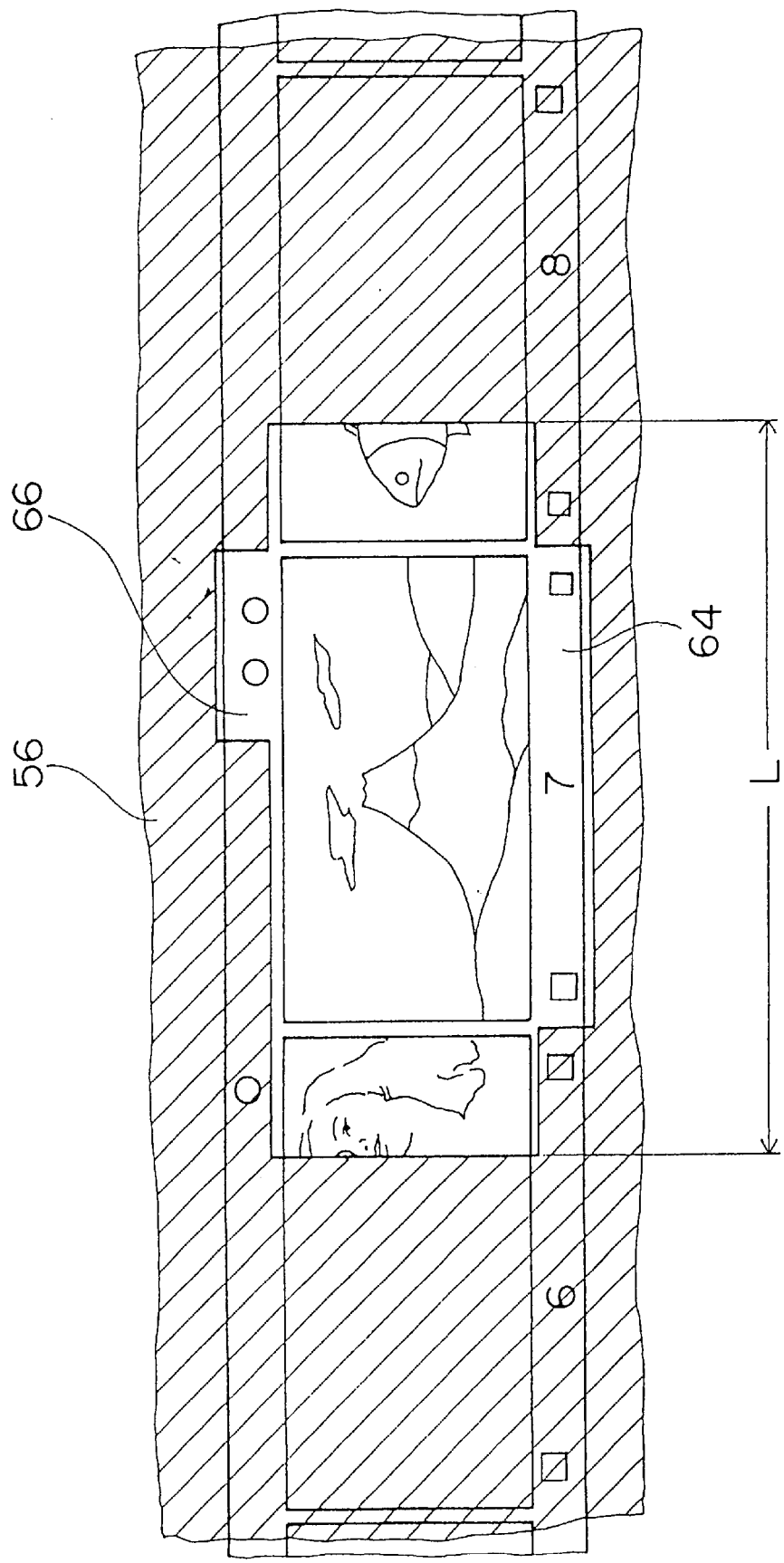
FIG. 6 is a view explaining the form of a mask shown in FIG. 5.

The shape of the mask 56 is depicted in FIG. 6. The user can observe the film of 1.5 frame through an aperture having the width L in the mask 56 as shown in FIG. 6. Thereby, the user can look at some portions of the images of the next frames on both sides of the currently-observed frame, and the user can confirm the image which has already been observed, or the image which is to be viewed. The desired image can be easily brought to the center of the viewer barrel 14. The width L of the aperture is not restricted to 1.5 frame of the film, and the width L may be more than 1 frame and less than 2 frames.

A film frame number display window 64 is formed at a part of the mask 56, which corresponds to the bottom edge of the film, and a frame number of the film can be confirmed through the film frame number display window 64. The film frame number display window 64 is opened which corresponds to the width of a frame on the film. Thus, a part of the next film frame numbers on both sides enters the frame number display window 64, thereby, the user can immediately confirm the next film frame number. A film photographing type display window 66 is formed at a part of the mask 56, which corresponds to the top edge of the film. A conventional type (C), a high-vision type (H) and a panorama type (P) of the film photographed by an optical print type writing camera can be confirmed through the film photographing type display window 66. That is, two circular marks are displayed in the case of the conventional type; no mark is displayed in the case of the high-vision type; and one circular mark is displayed in the case of the panorama type.

Figure 7:
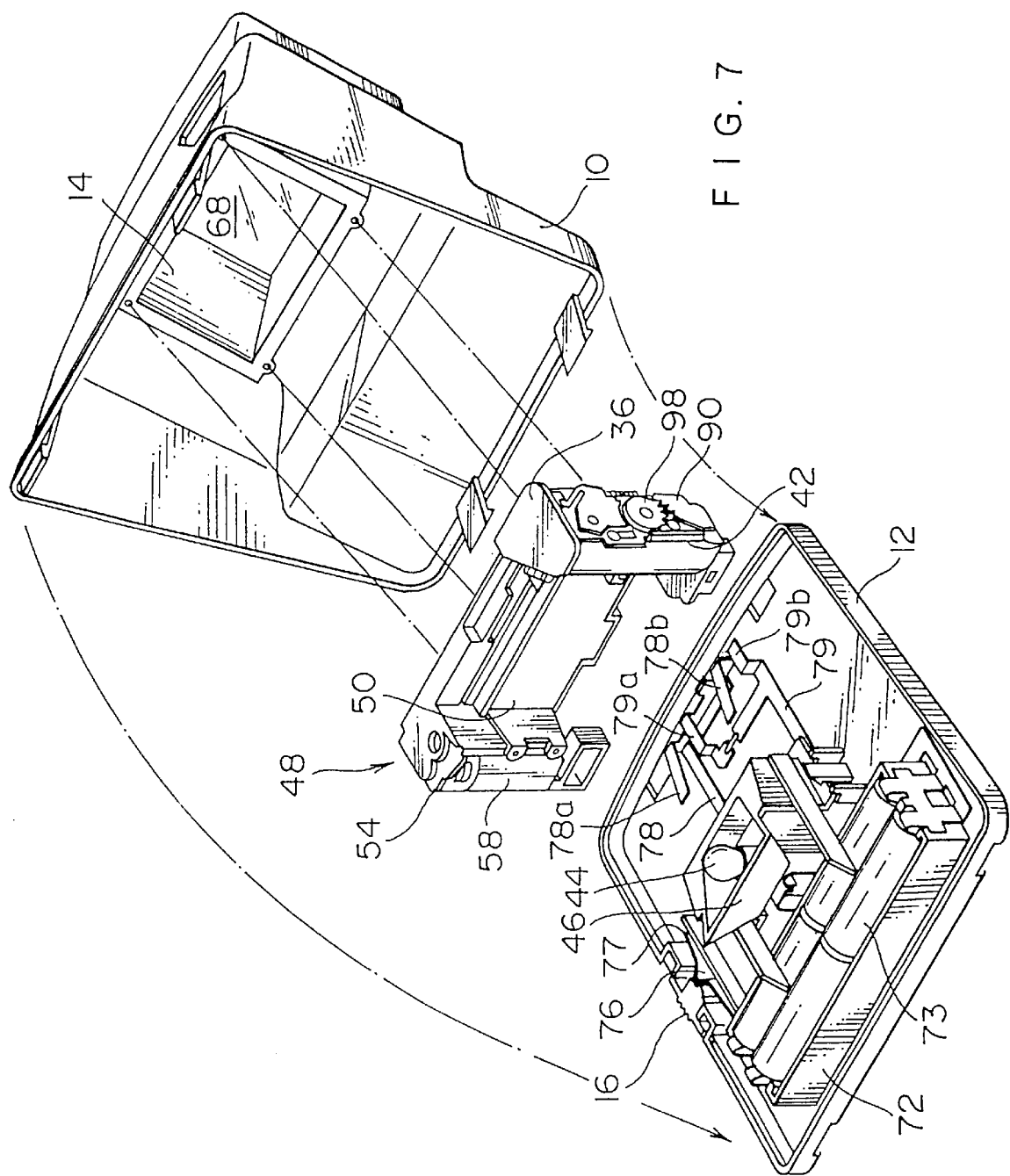
FIG. 7 is a view explaining the inner structure of the film viewer in FIG. 1.

FIG. 7 illustrates the inner structure of the film viewer according to the first embodiment of the present invention. The light source 44 held by the lamp house 46 is provided substantially at the center of the bottom plate 12. A battery housing part 72 is formed on the bottom plate 12, and four batteries 73 are housed in the battery housing part 72. A metal plate 76 is laid from the battery housing part 72 to the main switch 16, and a circuit is constructed in such a manner that when the main switch 16 is turned on, a contact 77 of the metal plate 76 is closed so that the light source 44 can be lighted.

Metal plates 78 and 79 connect to a positive pole and a negative pole, respectively, of the battery housed in the battery housing part 72, and they are laid to the bottom of the film feed button 20 and the film rewind button of the viewer body 10.

In the film feed unit 48, portions in a close proximity to four corners of the film exposure opening 62 formed on the film passage 61 are fixed to the film viewer body 10 by screws so that the opening 62 can correspond to the opening of the viewer barrel 14 on the film viewer body 10. The film feed motor incorporated into the film feed unit 48 connects to the metal plates 78 and 79 in a certain wiring (not shown). A circuit is constructed in such a manner that when the film feed button 20 or the film rewind button 22 is pressed, a contact of metal plates 78a and 79a or a contact of metal plates 78b and 79b is closed so that the film feed motor can be driven forward or backward.

Figure 8:
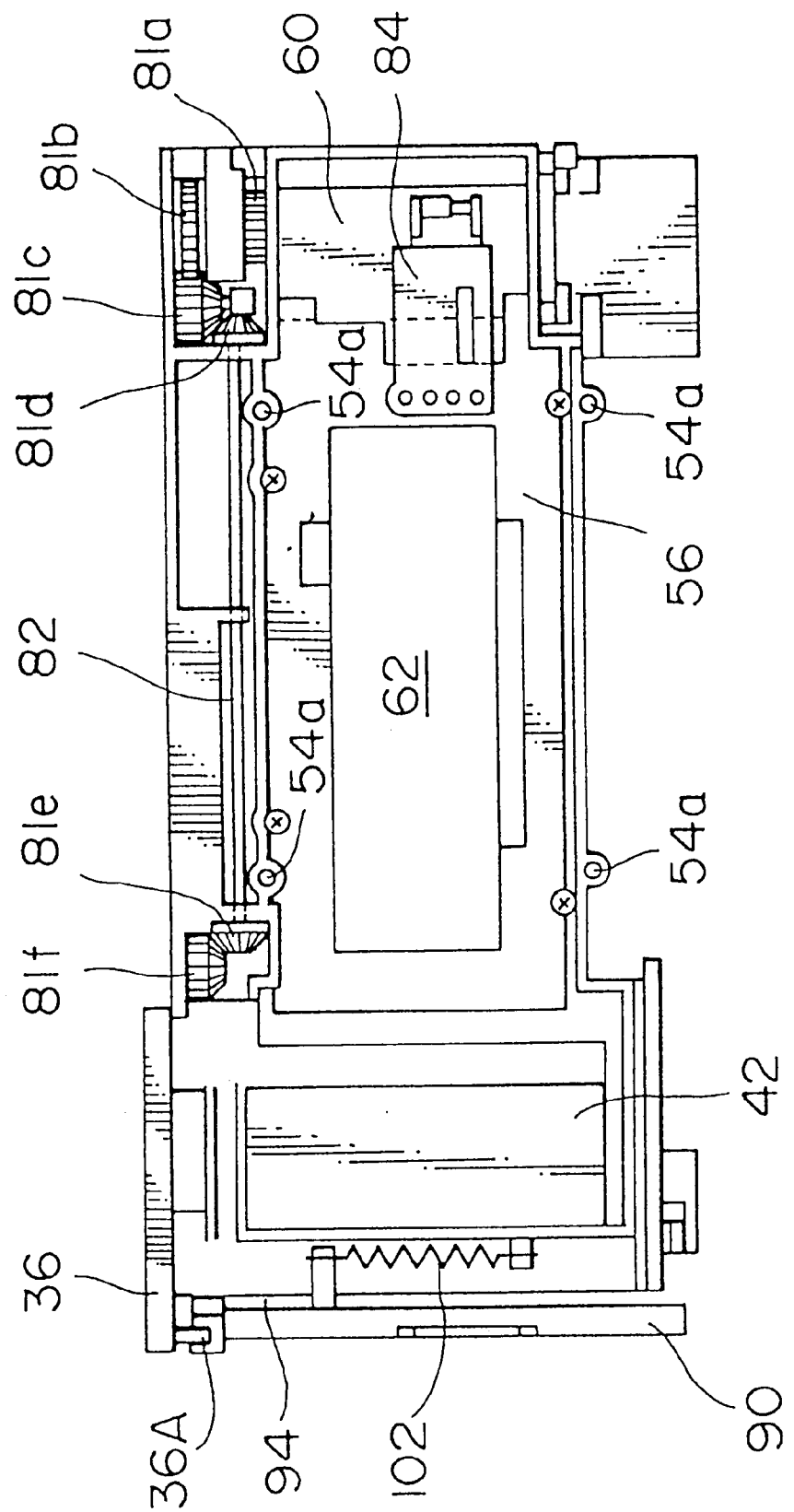
FIG. 8 is a front view of a film feed unit shown in FIG. 7.

FIG. 8 illustrates the film feed unit 48 viewed from the mask 56. The rectangular opening at the center of FIG. 8 is the film exposure opening 62, and the cartridge chamber 42 is arranged at the left of the opening 62, and the film takeup chamber 58 including the takeup spool 60 is arranged at the right of the opening 62. Holes 54a are formed in a close proximity to four corners of the opening 62, and the film feed unit 48 is attached to the viewer body 10 by the screws through the holes 54a.

The rotational force of the film feed motor (not shown) built in the takeup spool 60 is transmitted to the drive shaft of the cartridge chamber 42 at the left via the gears 81a, 81b, . . . , and 81f and a rotational shaft 82. The film 11 pulled out of the cartridge 1 is fed on the film passage 61 below the mask 56, and then the film 11 is taken up by the takeup spool 60 in a state of being pressed against the takeup spool 60 by a film pressing member 84, which is pushed in the direction of the diameter of the takeup spool 60.

Figure 9:
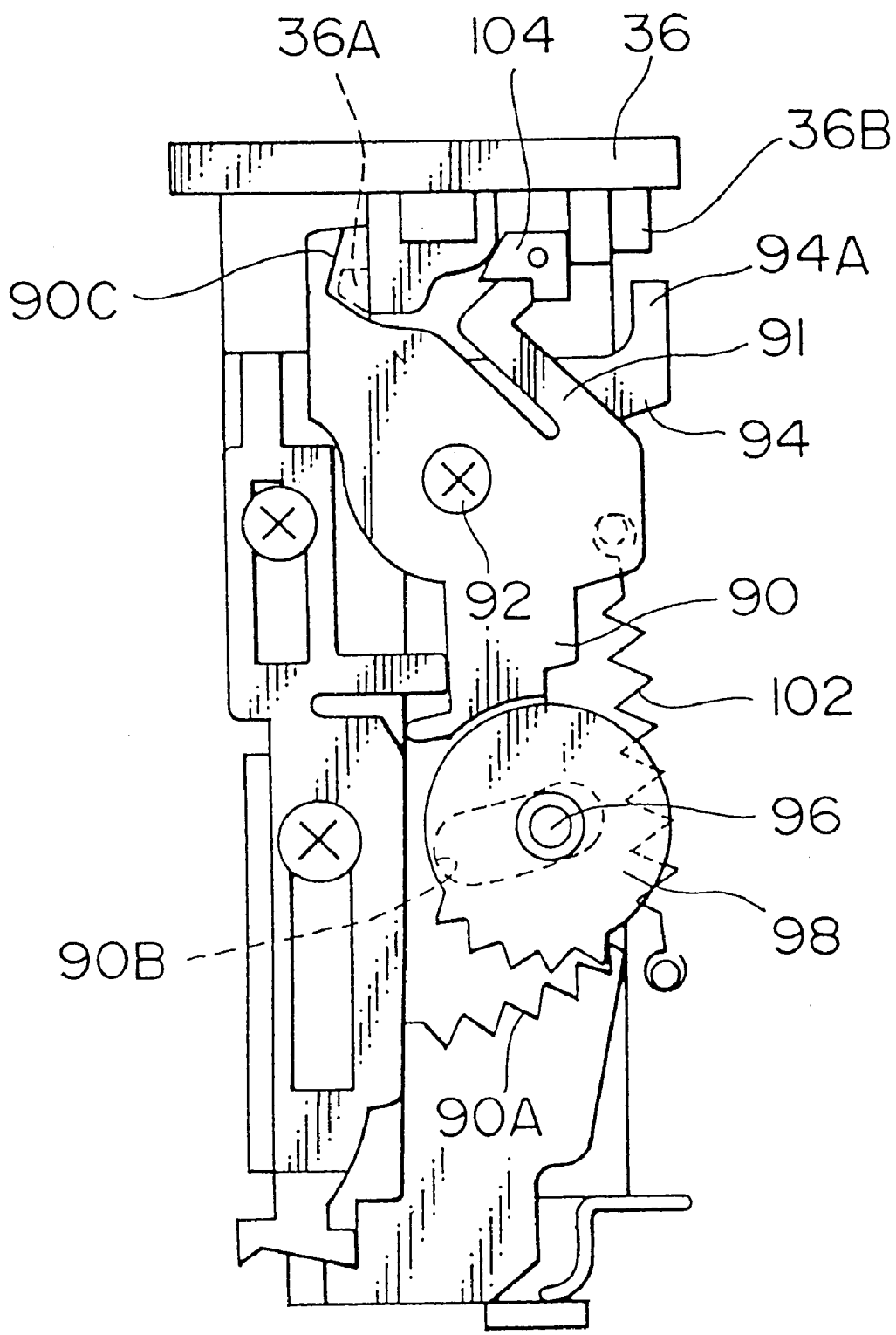
FIG. 9 is an enlarged side view of the film feed unit in FIG. 8.

Next, an explanation will be given about the lock mechanism of the cartridge chamber lid 36. FIG. 9 is a left side enlarged view of FIG. 8, and shows the state wherein the lid 36 is closed and locked. The lock mechanism is composed mainly of a lock member 90 supported in such a manner as to be rotatable about a rotational axis 92; a push-up member 94 rotatably supported under the lock member 90; a gear wheel 98 which is axially supported by a pin 96 and engaged with a gear 90A formed at the lock member 90 and which rotates in connection with the cartridge chamber lid opening knob 40 shown in FIG. 2; a spring 102 which pulls the lock member 90 in the downward direction in FIG. 9; and a coupling member 104 which is coupled to a substantially L-shaped arm 91 of the lock member 90. Holes 90B are formed at the lock member 90 and the push-up member 94, and the holes 90B are engaged with the pin 96, so that the lock member 90 and the push-up member 94 can rotate about the rotational axis 92. A concave is formed at a lower part of an upper-left end 90C of the lock member 90, and a substantially L-shaped chip 36A is formed at the back of the cartridge chamber lid 36. Thus, when the cartridge chamber lid 36 is closed, the chip 36A is engaged with the concave of the end 90C of the lock member 90. An end of the arm 91 of the lock member 90 is abutted against a step formed at the bottom of the coupling member 104 so that the lid 36 can be locked in the closed state.

In order to open the cartridge chamber lid 36, the cartridge chamber lid opening knob 40 in FIG. 2 is shifted down so that the gear wheel 98 can rotate counterclockwise in the drawing, and the lock member 90 coupled to the gear wheel 98 can rotate counterclockwise about the rotational axis 92. Thereby, the end 90C of the lock member 90, which is coupled to the chip 36A of the lid 36, moves to the left in the drawing. Thus, the end 90C of the lock member 90 is removed from the chip 36A, and the end of the arm 91 of the lock member 90 is removed from the coupling member 104. The right side of the L-shaped corner of the arm 91 is coupled to the left inclined plane of the coupling member 104. In this case, the push-up member 94, which is provided under the lock member 90, rotates about the rotational axis 92 along with the lock member 90, and the end of a push-up piece 94A of the push-up member 94 pushes up a projection 36B which projects from the lid 36. Thereby, the lid 36 jumps upward in the drawing.

Figure 10:
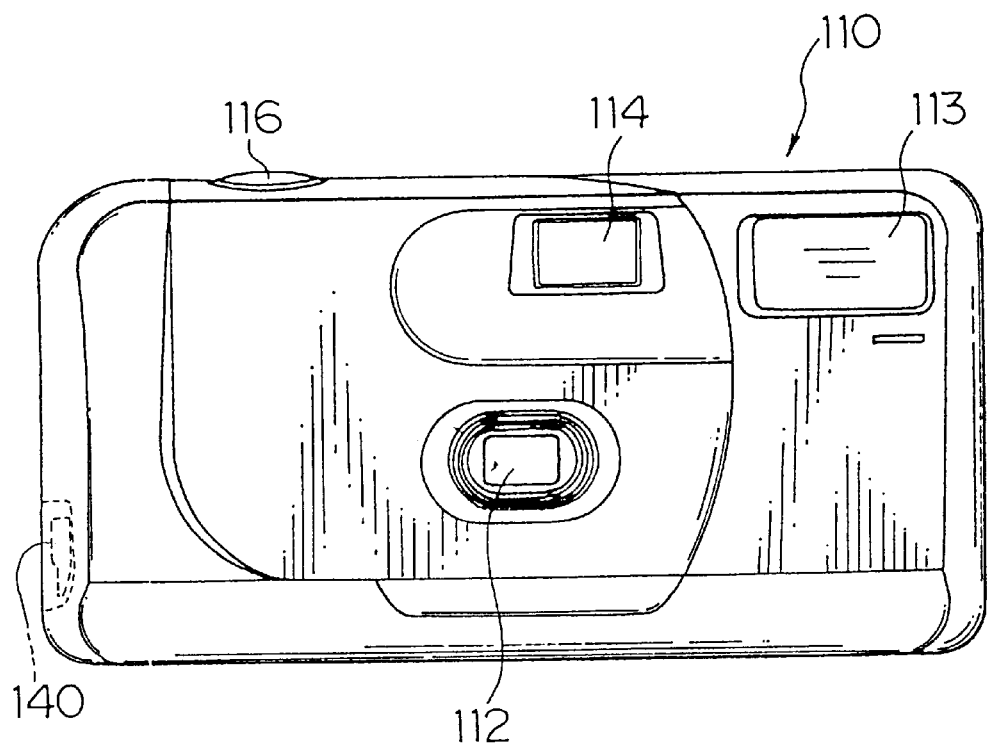
FIG. 10 is a front view of the camera used with the film feed unit.
Figure 11:
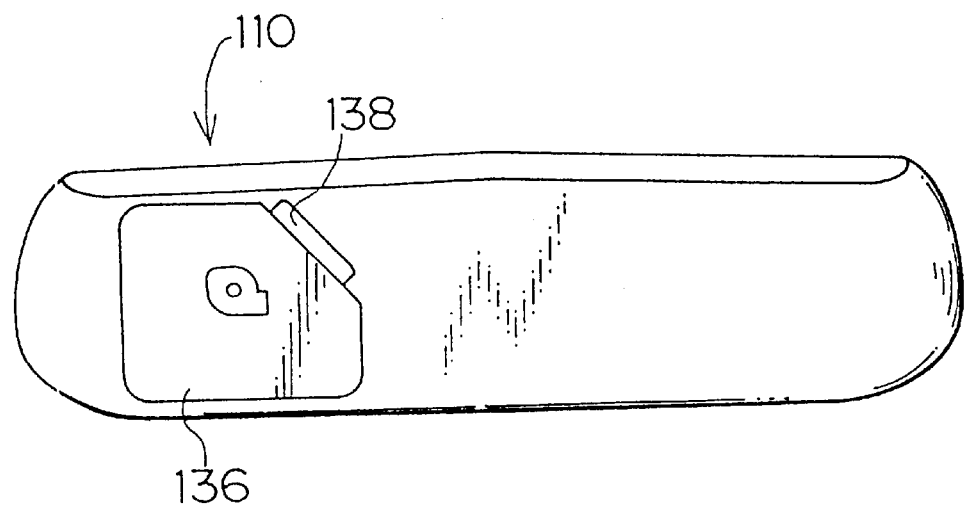
FIG. 11 is a bottom view of the camera in FIG. 10.
Figure 12:
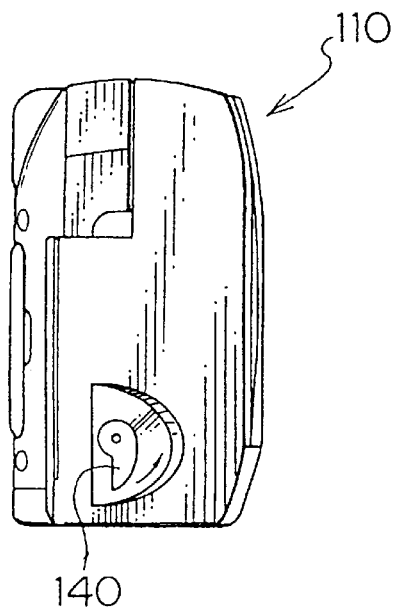
FIG. 12 is a left side view of the camera in FIG. 10.

FIGS. 10, 11 and 12 illustrate one example of a camera of which film feed unit is also used as the film feed unit 48 of the film viewer, including the cartridge chamber 42, the film takeup chamber 58 and the driving force transmission mechanism. FIGS. 10, 11 and 12 are a front view, a bottom view and a left side view, respectively, of the camera.

As shown in FIG. 10, a taking lens 112 is provided at the center of the front of a camera 110. A shutter (not shown) is provided on an optical axis of the taking lens 112 in the camera 110. A strobe 113 is provided at the upper right of the taking lens 112, and a finder objective window 114 is provided at the left of the strobe 113. A release button 116 is provided at the top of the camera 110, and the shutter works in connection with the operation of the release button 116 so that the film can be exposed.

As depicted in FIG. 11, a cartridge chamber lid 136 is provided at the bottom of the camera 110, and the lid 136 is swingable on a hinge 138 as is the case in FIG. 2. As shown in FIG. 12, a cartridge chamber lid opening knob 140 is provided at the side of the camera 110. When the knob 140 is pushed up to rotate from a vertical position to a horizontal position in FIG. 12, a lock mechanism, which is similar to the lock mechanism in FIG. 9, is released so that the lid 136 can be opened as is the case in FIG. 3.

Figure 13:
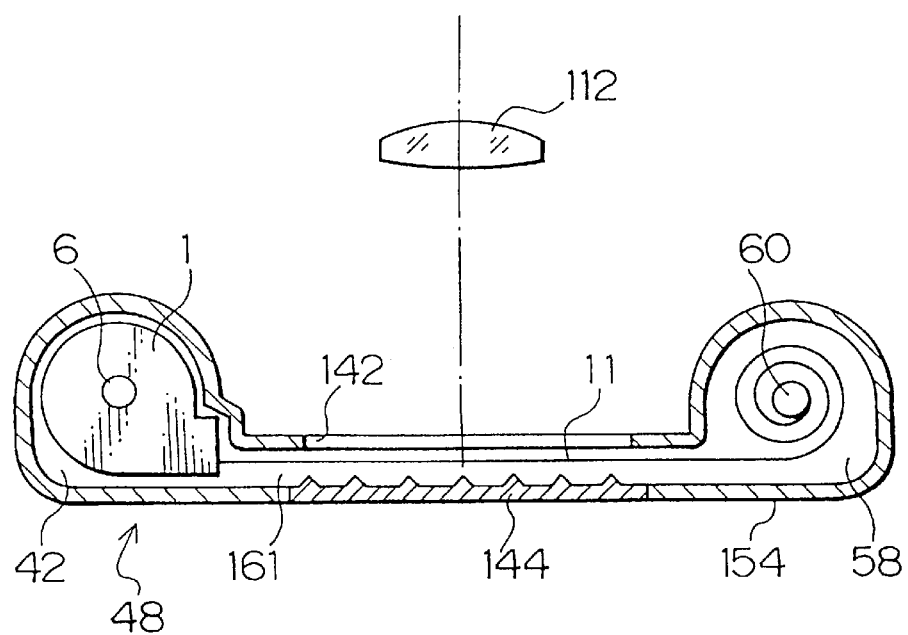
FIG. 13 is a view of assistance in explaining the inner structure of the camera in FIG. 10.
Figure 14:
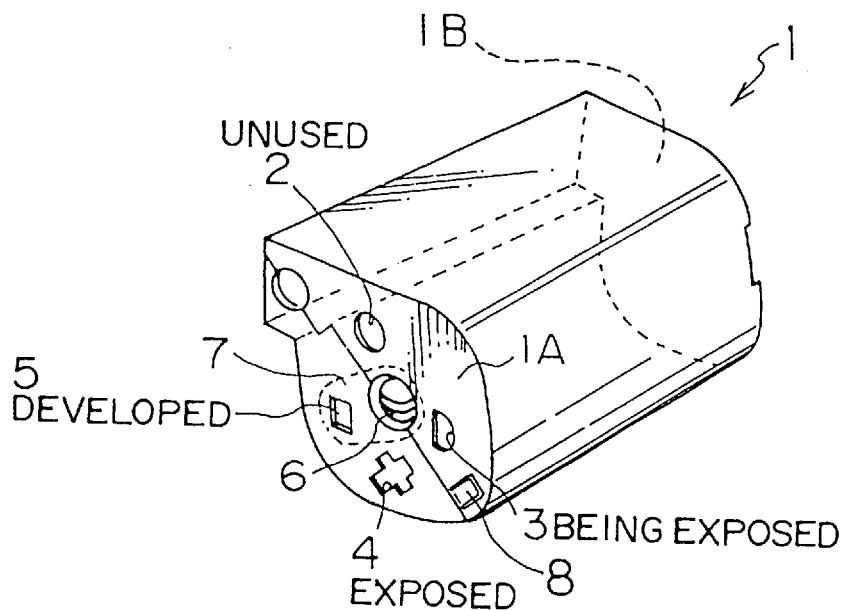
FIG. 14 is a perspective view of the cartridge used in the film viewer.

FIG. 13 illustrates the inner structure of the camera. The film 11 pulled out of the film cartridge 1 mounted in the cartridge chamber 42 is taken up by the takeup spool 60 of the film takeup chamber 58 while the film face is kept flat on a film passage 161. A film feed unit body 154 in FIG. 13 is similar to the film feed unit body 54 incorporated in the film viewer (see FIG. 5) except for a film exposure opening 142 and a film pressure plate 144. The film exposure opening 142 is formed above the film passage 161, that is, where the subject light is made incident through the taking lens 112 supported by a lens barrel (not shown). The film pressure plate 144 is provided at the back of the film 11 on the film passage 161. In the film feed unit body 154 of the camera, the exposure opening 142 at the front of the film 11 is restricted to the area of one frame on the film, whereas, in the film feed unit body 54 of the film viewer in FIG. 5, the visual field is broadened to about 1.5 frames so that the frame images before and after one frame can be partly looked at. Thus, in the film feed unit body 54 of the film viewer, the light transmission opening 63, which is similar to the exposure opening 142 of the film feed unit body 154 of the camera, for specifying the visual field is broadened in the film feed direction compared with the exposure opening 142.

If the visual field of the film viewer is restricted to the area of one frame, the above-mentioned change is not required. The film feed unit body 154 of the camera can be used as it is.

In the film viewer, the film exposure opening 62 should be formed in the place of the film pressure plate 144. Thus, the film pressure plate 144 my be constructed as a separate member which can be attached freely so that the film pressure plate 144 is removed for the film viewer, and the film pressure plate 144 is attached only for the camera. For another example, the film passage can be separately designed for the film viewer and the camera.

The operation of the film viewer according to the present invention which is constructed in the above-mentioned manner will be described as follows.

First, the cartridge chamber lid opening knob 40 is rotated down as shown in FIG. 3 to open the cartridge chamber lid 36, the film cartridge 1 is inserted into the cartridge chamber 42, and the lid 36 is closed and locked. Next, the main switch 16 is turned on so as to light the light source 44. When the film feed button 20 is pressed in this state, the motor (not shown) rotates, and the drive shaft engaged with the spool 6 of the cartridge 1 and the takeup spool 60 of the film takeup chamber 58 rotate so that the film 11 can be pulled out of the film cartridge 1 and taken up by the takeup spool 60. The film 11 pulled out of the film cartridge 1 is fed on the film passage 61, and the film images can be observed through the mask 56 and the viewer barrel 14.

When a film image to be observed is positioned under the viewer barrel 14 by feeding the film 11 by pressing the feed button 20, the feed button 20 is released. Then, the film 11 stops feeding, and the film image is observed. Since the width L of the aperture in the mask 56 is 1.5 frames, ¼ of the images in the next frames on both sides can be observed through the viewer barrel 14. Thus, the film image, which is to be observed next, can be easily confirmed.

When the film 11 is rewound, the film rewind button 22 is pressed and the motor is reversed. Then, the drive shaft engaged with the spool 6 of the cartridge 1 and the takeup spool 60 of the film takeup chamber 58 are reversed, and the film 11 is housed in the cartridge 1. The film rewind button 22 is kept pressed until the film 11 is completely housed in the film cartridge 1. If the film rewind button 22 is pressed further in such a state that the film 11 is completely housed in the film cartridge 1, the cartridge pickup confirmation lamp 24 is lighted every time the spool is rotated once. The film rewind button 22 is released when the cartridge pickup confirmation lamp 24 is lighted. When the lamp 24 is lighted, the white plate 7 of the film cartridge 1 is located at a position indicating that the film cartridge 1 contains the developed film. Thus, if the film cartridge 1 is picked up from the cartridge chamber 42 when the cartridge pickup confirmation lamp 24 is lighted, the visual exposure index of the film cartridge 1 indicates that the film has already been developed.

In the first embodiment, the cartridge pickup confirmation lamp 24 is provided as the indication means for indicating that the visual exposure index of the film cartridge indicates that the film cartridge contains the developed film. The present invention, however, should not be restricted to this. Indication means such as a sound, a colored plate, etc. may be provided. The film in the film cartridge 1 in this embodiment may be either negative or positive.

As stated above, the film feed unit of the film viewer, including the cartridge chamber, the film takeup chamber and the driving force transmission mechanism, is also used as the film feed unit incorporated into the camera. Thereby, the designing and manufacturing costs of the film viewer can be lowered, and the film viewer can be low-priced.

Figure 16:
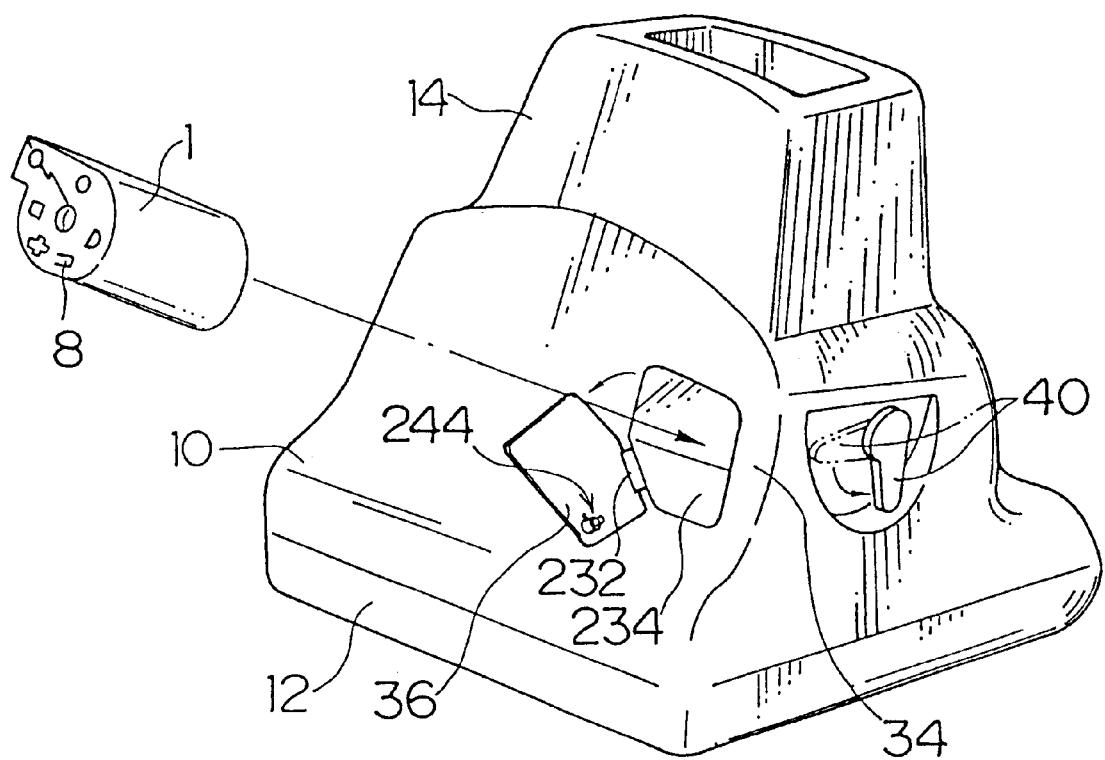
FIG. 16 is a perspective view, taken from the back, of the film viewer according to the second embodiment of the present invention.

FIG. 16 is a perspective view of the film viewer, taken from the back, according to the second embodiment of the present invention. Parts similar to those previously described with reference to FIGS. 1–15 are denoted by the same reference numerals, and they will not be described in detail.

In FIG. 16, the cartridge chamber lid 36 is provided on the flat portion 34 at the back of the film viewer body 10. The lid 36 is substantially trapezoid in order to correspond to the external shape of the cartridge 1. As shown in FIG. 17, the lid 36 is openably connected to a film feed unit 230 via a hinge 232. The film feed unit 230 is incorporated into the film viewer body 10. A cartridge chamber 234 for housing the film cartridge 1 is provided at the lower section in the drawing; a film exposure opening 236 is formed at the center; a takeup chamber 238 is formed at the upper section; and a takeup spool 240 is provided in the takeup chamber 238. The lid 36 is opened, and the film cartridge 1 is mounted in the housing chamber 234. The film pulled out of the film cartridge 1 is observed at the film exposure opening 236 through the viewer barrel 14, and then the film is taken up by the takeup spool 240 of the takeup chamber 238.

A detection mechanism 244 for detecting that the film cartridge 1 contains undeveloped film is provided at the back of the lid 36 as depicted in FIGS. 16 and 17.

The detection mechanism 244 has a detecting pin (a detecting member) 246 as shown in FIG. 17. The detecting pin 246 is provided at such a position as to be abutted against the undevelopment indicating chip 8 of the film cartridge 1 when the film cartridge 1 with unbroken undevelopment indicating chip 8 is housed in the cartridge chamber 234 and the lid 36 is closed. The chip 8 indicates that the film contained in the film cartridge 1 has not been developed. As depicted in FIG. 17 and 18, the detecting pin 246 is attached to a cylinder 248 integrated with the lid 36 in such a manner as to be projectable and retractable, and the detecting pin 246 is pushed in a direction to project from the cylinder 248 by the force of a spring 250 mounted in the cylinder 248. A stopper pin (a stopper member) 252 is integrated with the base of the detecting pin 246. The stopper pin 252 is extended in a direction perpendicular to the detecting pin 246, and the stopper pin 252 projects to the outside from the cylinder 248 via a substantially spiral cam groove 254 formed on the cylinder 248. The stopper pin 252 is abutted against one end 254A of the cam groove 254 to thereby prevent the detecting pin 246 from falling out of the cylinder 248.

Figure 19:
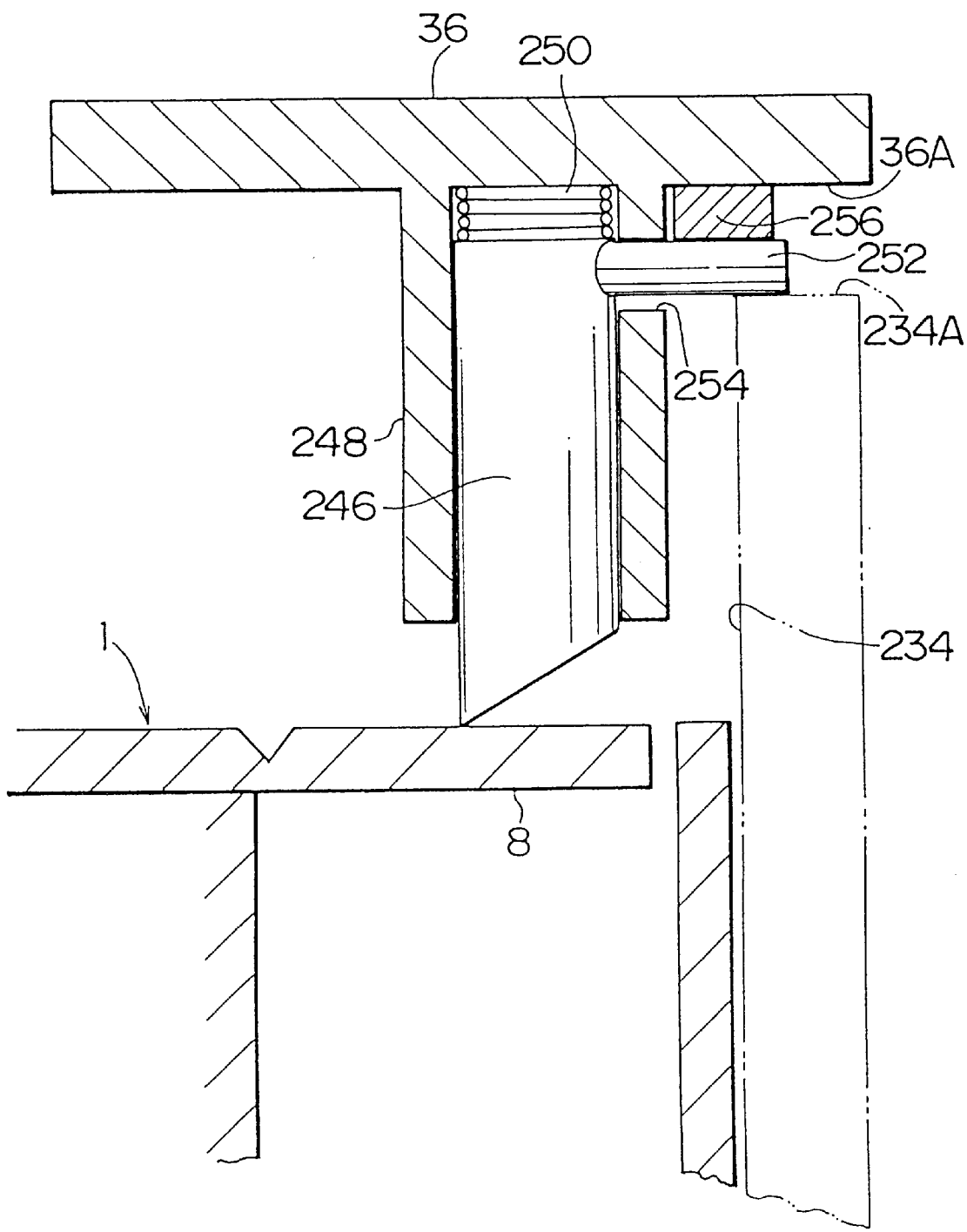
FIG. 19 is an enlarged sectional view illustrating a state where a pin of the detection mechanism is abutted against an undevelopment indicating chip.

As the detecting pin 246 retracts into the cylinder 248 against the force of the spring 250, the stopper pin 252 moves along the cam groove 254 so that the detecting pin 246 rotates. Thus, the position of the stopper pin 252 differs according to whether the detecting pin 246 projects (see FIG. 18) or retracts (see FIG. 19). When the detecting pin 246 retracts as shown in FIG. 19, the stopper pin 252 is positioned between an end 234A of the cartridge chamber 234 and a peripheral edge 36A of the back of the lid 36. That is, when the detecting pin 246 retracts, the stopper pin 252 advances to the closed position of the lid 36 to prohibit the lid 36 from being completely closed. Reference numeral 256 is a supporting block (a supporting member) for preventing the stopper pin 252 from being broken. The supporting block 256 is attached on the back of the lid 36, or it is integrated with the lid 36.

Next, an explanation will be given about the operation of the detection mechanism 244 which is constructed in the above-mentioned manner.

Figure 20:
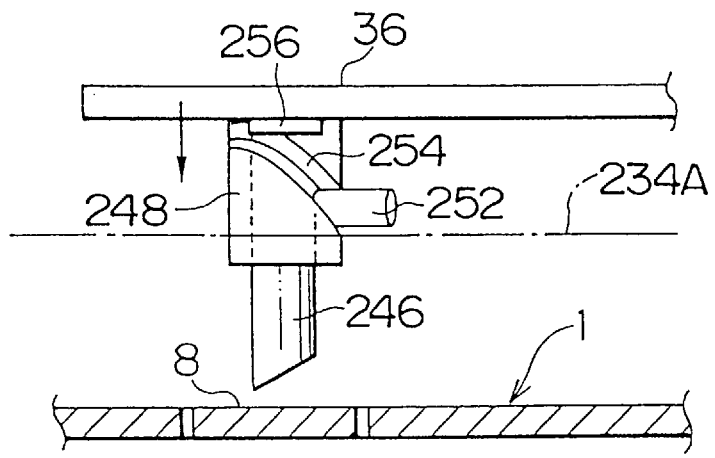
FIG. 20 is a view describing an operation of the detection mechanism.
Figure 21:
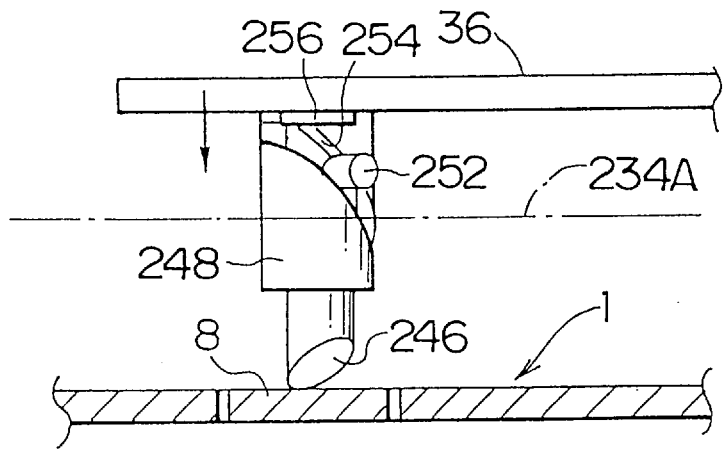
FIG. 21 is a view describing an operation of the detection mechanism.

First, the cartridge chamber lid 36 of the film viewer is opened, and the film cartridge 1 is mounted in the cartridge chamber 234. If the film cartridge 1 contains the undeveloped film, that is, if the undevelopment indicating chip 8 of the film cartridge 1 has not been broken, the detecting pin 246 is abutted against the undevelopment indicating chip 8 as the lid 36 is closed as indicated by an arrow in FIG. 20. Then, as the lid 36 is closed, the detecting pin 246 is pushed by the undevelopment indicating chip 8 as shown in FIG. 21 so that the detecting pin 246 starts retracting into the cylinder 248 against the force of the spring 250. In this case, the stopper pin 252 is guided by the cam groove 254, and the detecting pin 246 moves in the retracting direction while rotating. The stopper pin 252 moves to the closed position of the lid 36 in FIGS. 19 and 22. In this case, because the stopper pin 252 is located between the end 234A of the cartridge chamber 234 and the peripheral edge 36A of the back of the lid 36, the stopper pin 252 interferes with the lid 36, and the lid 36 cannot be completely closed.

Figure 22:
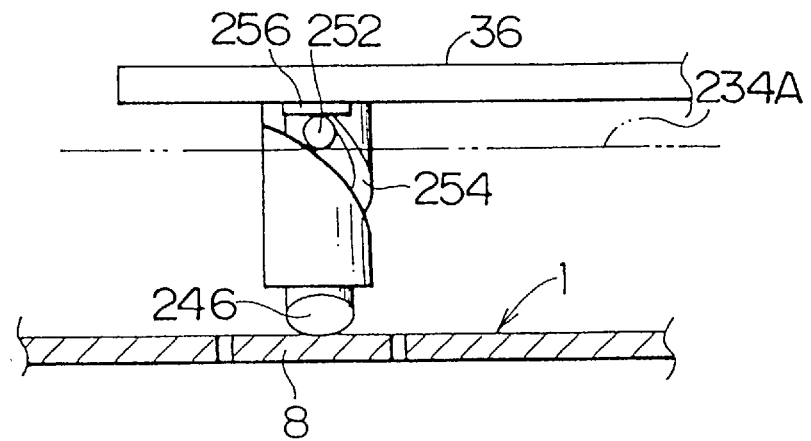
FIG. 22 is a view illustrating a state where the detection mechanism prohibits a lid from being completely closed.

Thus, in this embodiment, when the lid 36 is not completely closed, it can be confirmed that the film cartridge containing the undeveloped film cartridge has been loaded. If the lid 36 is further closed while the stopper pin 252 interferes with the lid 36, the stopper pin 252 can be broken by the counterforce from the end 234A of the cartridge chamber 234. In this embodiment, however, the supporting block 256 receives the counterforce via the stopper pin 252 as shown in FIGS. 19 and 22. Thereby, the stopper pin 252 can be prevented from being broken.

Figure 23:
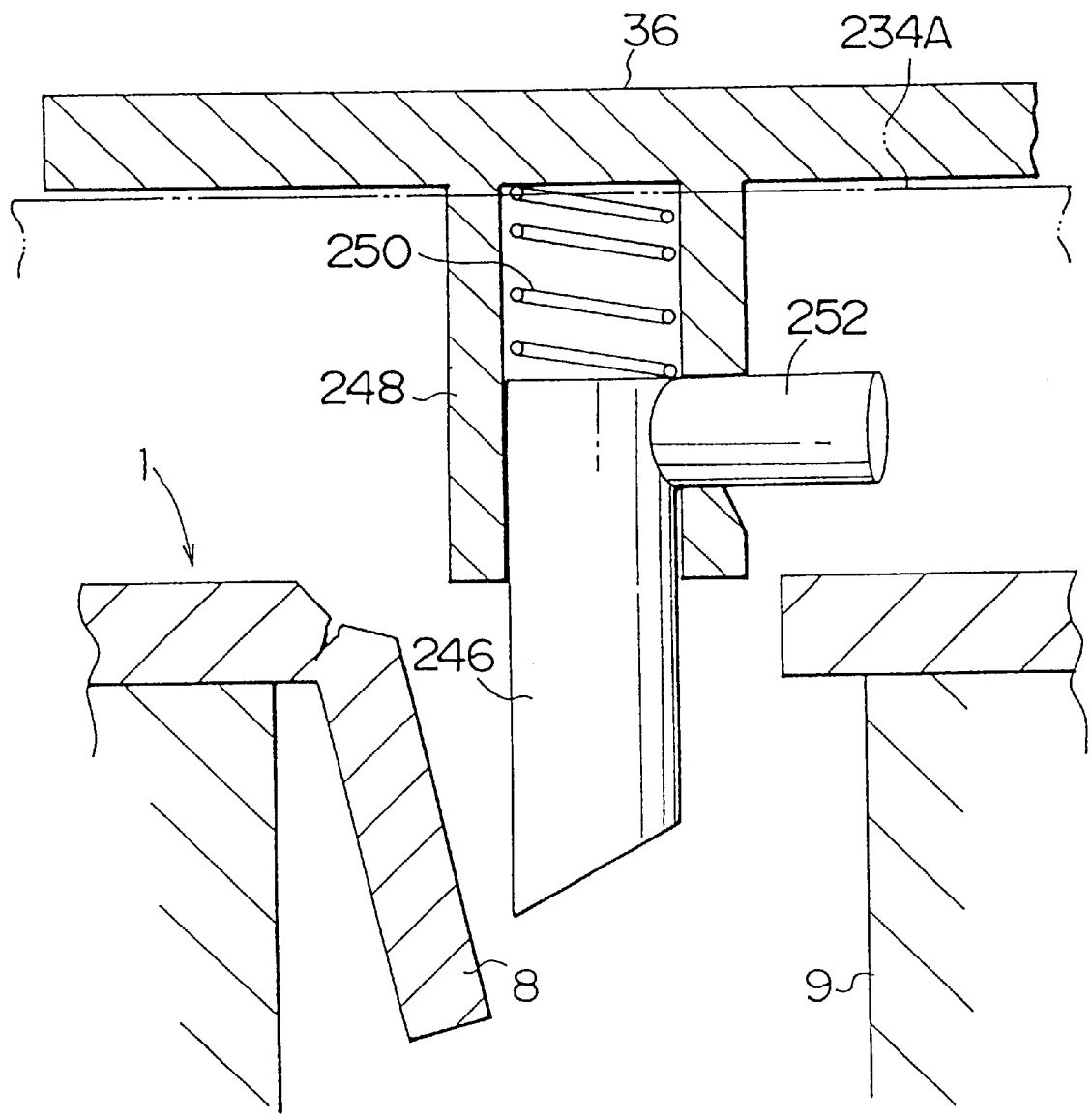
FIG. 23 is an enlarged sectional view illustrating a relationship between the broken undevelopment indicating chip and the detection mechanism.

On the other hand, when the film cartridge 1 containing the developed film is mounted, that is, when the undevelopment indicating chip 8 is broken as shown in FIG. 23, the detecting pin 246 is inserted into a concave 9 without abutting against the undevelopment indicating chip 8. Thus, the detection mechanism 244 does not function, and the cover 36 can be completely closed.

As set forth hereinabove, according to the film viewer of the present invention, the film feed unit to be incorporated into the camera is also used as the film feed unit of the film viewer, so that the designing and manufacturing costs of the film viewer can be lowered and the film viewer can be low-priced.

As stated above, according to the film viewer of the present invention, the visual field of the film through the viewer window is set to be more than 1 frame and less than 2 frames. Thus, a part of the frames before and after the observed frame can also be observed so that the image to be observed next can be easily captured.

As stated above, according to the film viewer of the present invention, the film viewer window is inclined to the user's side so that he or she can easily observe the film image.

As stated above, according to the film viewer of the present invention, there is provided the indication means which indicates that the visual exposure index of the film cartridge indicates that the film cartridge contains the developed film. Thereby, the simple mechanism allows the film cartridge to be unloaded from the film viewer when the visual exposure index indicates that the film has already been developed.

As stated above, according to the film viewer of the present invention, the cartridge chamber lid is provided with the detection mechanism which detects the undevelopment indicating chip of the film cartridge housed in the cartridge chamber to prohibit the lid from closing. Thereby, the simple structure can prevent the undeveloped film from being pulled out from the film cartridge by mistake without the microcomputer, etc.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A film viewer comprising:
   a cartridge chamber for housing a removable film cartridge containing photographic film which has a plurality of photographing frames and is would around a spool;
   a film takeup chamber provided with a takeup spool for taking up said photographic film pulled out of said film cartridge mounted in said cartridge chamber;
   a film passage having an aperture between said cartridge chamber and said film takeup chamber, said aperture specifying a visual field, said film passage keeping flat said photographic film pulled out of said film cartridge;
   a film feed mechanism engaged with said spool of said film cartridge mounted in said cartridge chamber, said film feed mechanism winding up said photographic film from said film cartridge into said film takeup chamber or rewinding said photographic film taken up by said takeup spool of said film takeup chamber around said spool of said film cartridge;
   a viewer window through which a frame image on developed film pulled out of said film cartridge is observed; and
   wherein said cartridge chamber, said film takeup chamber and said film feed mechanism comprise a film feed unit, said film feed unit being adapted for incorporation into a camera using said film cartridge;

wherein a visual field in a film feed direction through said viewer window is larger than a size of a frame on said film so that more than a single frame is viewable at any time during use of the film viewer.

2. The film viewer as defined in claim 1, wherein said visual field is regulated by a mask.

3. The film viewer as defined in claim 2, wherein a film photographing type displaying window and a film frame number displaying window are formed on said mask.

4. A method of manufacturing a film viewer, comprising the steps of:

providing a film viewer housing adapted to accept a film feed unit so that said film feed unit positions a film frame to be viewed intermediate a light source and a viewing aperture; and installing a removable film feed unit, designed for incorporation into a camera body, into said film viewer housing, said film feed unit comprising:

a film feed motor electrically connected to an electrical power source when the film feed unit is attached to the housing;

a cartridge chamber including a rotatable drive shaft, the drive shaft being mechanically connected to the film feed motor, the cartridge chamber being structured and arranged to accept a film cartridge containing only one film supply spool so that the rotatable drive shaft is able to engage the film supply spool, the cartridge chamber being accessible from an exterior of the housing when the removable film feed unit is installed in the housing;

a rotatable takeup spool mechanically connected to the film feed motor; and a film Passageway arranged between the cartridge chamber and the takeup spool.

5. A film viewer comprising:

a housing, including an electrical power source;

a viewer window disposed on the housing; and a film feed unit removably attached to the housing, the removable film feed unit comprising:

a film feed motor electrically connected to the electrical power source when the film feed unit is attached to the housing;

a cartridge chamber including a rotatable drive shaft, the drive shaft being mechanically connected to the film feed motor, the cartridge chamber being structured and arranged to accept a film cartridge containing only one film supply spool so that the rotatable drive shaft is able to engage the film supply spool, the cartridge chamber being accessible from an exterior of the housing when the removable film feed unit is installed in the housing;

a rotatable takeup spool mechanically connected to the film feed motor; and a film passageway arranged between the cartridge chamber and the takeup spool;

wherein when the removable film feed unit is installed in the housing and a film cartridge is inserted in the cartridge chamber from the exterior of the housing, actuation of the film feed motor causes a photographic film strip wound within the film cartridge to be ejected from the film cartridge and pass through the film passageway by the viewer window to the takeup spool, allowing a user to view images on the photographic filmstrip through the viewer window.

6. The film viewer of claim 5, further comprising at least one control device disposed on the housing, the at least one control device being electrically connected between the power source and the film feed unit, the at least one control device allowing a user to control actuation of the film feed motor.

7. The film viewer of claim 6, wherein the at least one control device allows for the film feed motor to be selectively actuated to move the filmstrip in both an advancing direction and a rewinding direction.

8. The film viewer of claim 5, wherein a visual field in a film feed direction through the viewer window is larger than a size of a frame on the filmstrip, so that more than one frame is viewable at any time through the viewer window.

9. The film viewer of claim 5, wherein the film feed unit is a subassembly of a camera.

10. The film viewer of claim 5, further comprising a light source disposed within the housing, the light source being able to illuminate the more than one frame of the filmstrip located adjacent the viewer window.

11. The film viewer of claim 10, further comprising a diffusion plate disposed between the light source and the film passageway.

12. The film viewer of claim 11, further comprising a blue filter disposed between the light source and the film passageway.

13. A system for making photographic images on a filmstrip and for viewing the photographic images after processing of the filmstrip, comprising:

a film feed unit comprising:

a film feed motor;

a cartridge chamber including a rotatable drive shaft, the drive shaft being mechanically connected to the film feed motor, the cartridge chamber being structured and arranged to accept a film cartridge containing only one film supply spool so that the rotatable drive shaft is able to engage the film supply spool;

a rotatable takeup spool mechanically connected to the film feed motor; and a film passageway arranged between the cartridge chamber and the takeup spool;

a film viewer comprising:

a housing;

a light source disposed within the housing;

a viewer window disposed on the housing; and a film viewer power supply; and a camera comprising:

a camera body;

a taking lens disposed on the camera body;

a shutter mechanism disposed within the camera body behind the taking lens; and a camera power source disposed within the camera body;

wherein the film feed unit, the camera, and the film viewer are structured and arranged so that the film feed unit may be removably installed in both the camera and the film viewer.

14. The system of claim 13, wherein the film viewer further comprises viewer controls arranged on an outside of the housing, the camera further comprising camera controls arranged on an outside of the camera body.

15. The system of claim 14, wherein the viewer controls are electrically connected between the film viewer power supply and the film feed unit when the film feed unit is installed in the film viewer, allowing control of the film feed unit to perform both film advance and film rewind functions.

16. The system of claim 14, wherein the camera controls are electrically connected between the camera power source and the film feed unit when the film feed unit is installed in the camera, allowing control of the film feed unit to perform both film advance and film rewind functions.

17. The system of claim 13, further comprising a film pressure plate which is attached to the film feed unit only when the film feed unit is installed in the camera.

* * * * *